US011285665B2

(12) United States Patent
Puigardeu Aramendia et al.

(10) Patent No.: US 11,285,665 B2
(45) Date of Patent: *Mar. 29, 2022

(54) GENERATING THREE-DIMENSIONAL OBJECTS

(71) Applicant: Hewlett-Packard Development Company, L.P., Spring, TX (US)

(72) Inventors: Sergio Puigardeu Aramendia, Barcelona (ES); Alejandro Manuel De Pena, Barcelona (ES); Sebastia Cortes Herms, Barcelona (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 175 days.

This patent is subject to a terminal disclaimer.

(21) Appl. No.: 16/717,407

(22) Filed: Dec. 17, 2019

(65) Prior Publication Data

US 2021/0178674 A1 Jun. 17, 2021

Related U.S. Application Data

(63) Continuation of application No. 15/121,894, filed as application No. PCT/US2014/032379 on Mar. 31, 2014, now Pat. No. 10,549,518.

(51) Int. Cl.
*B29C 64/153* (2017.01)
*B29C 64/393* (2017.01)
*B29C 64/205* (2017.01)
*B29C 64/245* (2017.01)
*B29C 64/343* (2017.01)
(Continued)

(52) U.S. Cl.
CPC .......... *B29C 64/205* (2017.08); *B29C 64/153* (2017.08); *B29C 64/245* (2017.08); *B29C 64/343* (2017.08); *B29C 64/393* (2017.08); *B33Y 10/00* (2014.12); *B33Y 30/00* (2014.12); *B33Y 40/00* (2014.12); *B33Y 50/02* (2014.12)

(58) Field of Classification Search
None
See application file for complete search history.

(56) References Cited

U.S. PATENT DOCUMENTS 5,121,329 A 6/1992 Crump
5,204,055 A 4/1993 Sachs et al.
(Continued)

FOREIGN PATENT DOCUMENTS

CN 100448649 1/2009
EP 0 856 393 A2 8/1998
(Continued)

OTHER PUBLICATIONS

Shawn Fitzgerald. "A Pneumatic Conveying Powder Delivery System for Continuously Heterogeneous Material Deposition in Solid Freeform Fabrication," Research paper. Virginia Polytechnic Institute and State University, Jul. 1996, 153 pages, accessed on Aug. 1, 2015 at http://citeseerx.ist.psu.edu/viewdoc/download?doi=10.1.1.172.1945&rep=rep1&type=pdf.

*Primary Examiner* — Alexander M Weddle
(74) *Attorney, Agent, or Firm* — HP Inc. Patent Department (57) ABSTRACT

Apparatus, computer readable medium, or method to determine a layer volume change in a processed layer of powder, and distribute an additional amount of powder in a subsequent layer based on the determined layer volume change.

20 Claims, 5 Drawing Sheets

(51) Int. Cl.
*B33Y 40/00* (2020.01)
*B33Y 10/00* (2015.01)
*B33Y 50/02* (2015.01)
*B33Y 30/00* (2015.01)

(56) References Cited

U.S. PATENT DOCUMENTS

| | | | |
|---|---|---|---|
| 5,945,058 | A | 8/1999 | Manners et al. |
| 6,850,334 | B1 | 2/2005 | Gothait |
| 7,020,539 | B1 | 3/2006 | Kovacevic et al. |
| 10,549,518 | B2 * | 2/2020 | Puigardeu Aramendia ................ B29C 64/245 |
| 2003/0003017 | A1 | 2/2003 | Abe et al. |
| 2004/0228754 | A1 * | 11/2004 | Abe .................. B22F 3/004 419/6 |
| 2010/0121476 | A1 | 5/2010 | Kritchman |

FOREIGN PATENT DOCUMENTS

| | | |
|---|---|---|
| JP | 2009107244 | 5/2009 |
| JP | 2013-075391 | 4/2013 |
| KR | 10-2000-0016233 | 3/2000 |
| KR | 10-2003-0085532 | 11/2003 |
| KR | 10-2004-0004635 | 1/2004 |
| WO | WO-2014/012764 A1 | 1/2014 |

\* cited by examiner

GENERATING THREE-DIMENSIONAL OBJECTS

CROSS-REFERENCE TO RELATED APPLICATION

This application is a continuation of co-pending U.S. patent application Ser. No. 15/121,894, filed Aug. 26, 2016, which is the United States National Stage Application of International Patent Application PCT/US2014/032379, filed Mar. 31, 2014, the entire contents of which are hereby incorporated by reference as though fully set forth herein.

BACKGROUND

Additive manufacturing systems that generate three-dimensional objects on a layer-by-layer basis have been proposed as a potentially convenient way to produce three-dimensional objects. The quality of objects produced by such systems may vary widely depending on the type of additive manufacturing technology used.

DETAILED DESCRIPTION

Figure 1:
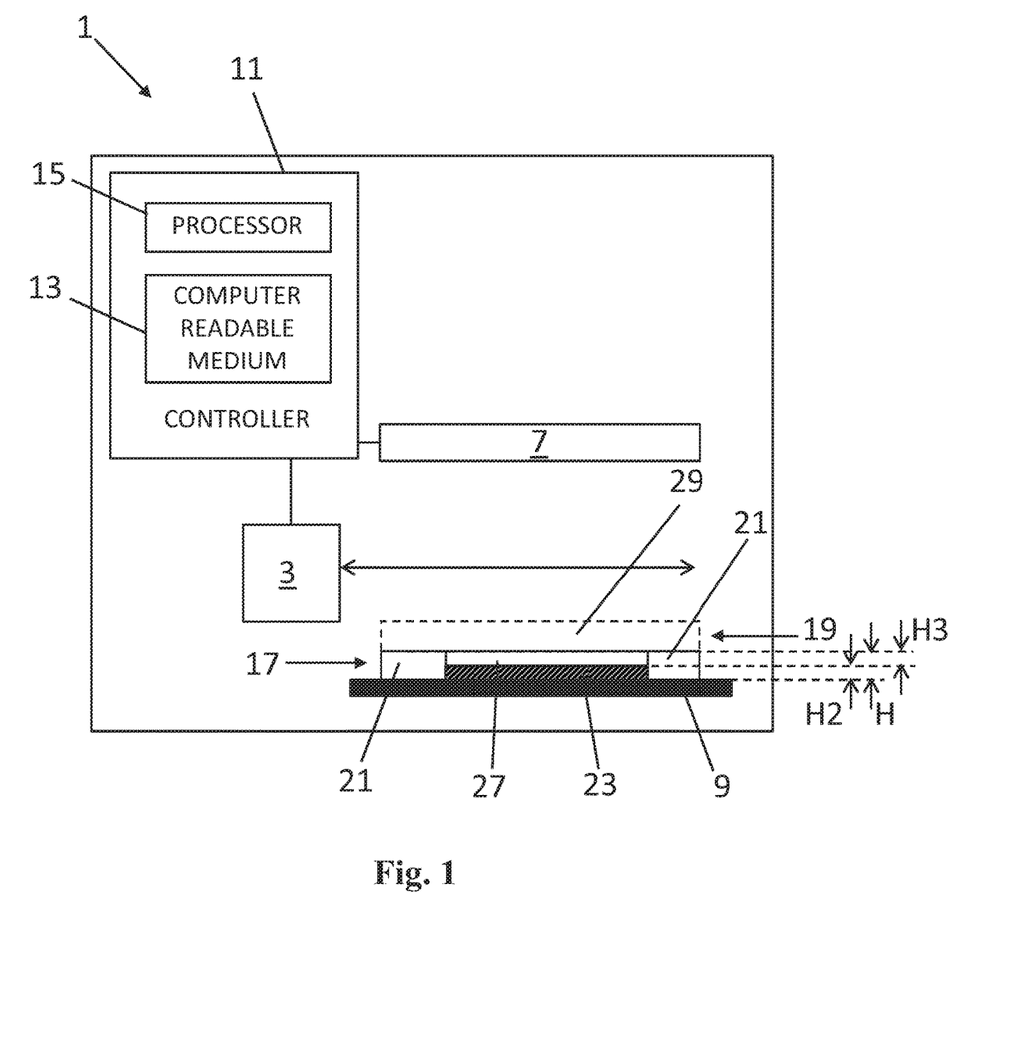
FIG. 1 is a diagram of an example of an apparatus to generate three-dimensional objects.

FIG. 1 illustrates an example apparatus 1 to generate 3D (three-dimensional) objects. The apparatus 1 includes a powder distributor 3 to distribute powder, in layers, on top of an object support 9. Powder is meant to encompass powder-based materials, particulate materials and granular materials. In yet a further example the powder may include semi-crystalline thermoplastic material. One suitable material may be Nylon 12. Another suitable material may be PA 2200. Suitable powders may include powdered metal materials, powdered composited materials, powder ceramic materials, powdered glass materials, powdered resin material, powdered polymer materials, and the like.

The apparatus 1 further includes a binder 7. In one example the binder 7 includes an agent distributor to dispense at least one agent in respective patterns onto successive layers of the powder, each pattern defining a slice of the object to be generated. Here, the apparatus 1 may be a powder based 3D printing apparatus. The agent may be a fluid that stimulates binding of the powder or that adheres to or unifies with the powder. In another example the binder 7 includes a light source to emit light in respective patterns onto successive layers of the powder. The light source is to at least partly melt the powder to unify the particles, and thereafter solidify the unified particles, thereby binding respective patterns of the powder layer. Here, the apparatus 1 may be a laser sintering apparatus and the light source includes a suitable laser source.

The binding process may involve multiple steps. One step can be the melting of the powder and another step can be the unification and solidification of the powder. Where binding agent is used, the binding may involve the agent adhering to and/or melting of the powder, and subsequent solidification of the powder and agents. In an example a temporary application of energy such as light or heat is used to aid in heating up portions of the powder above a melting point of the powder and thereby unify. In yet another example an application of energy such as light follows after melting the powder, for example to stimulate further unification or solidification. In further examples, said energy is applied to the combination of powder and agent, wherein the agent may aid in absorbing the energy.

The binder 7 is to form a unified, solidified region from the powder, and in one example from the combination of powder and agent. In the latter example the binder 7 is an agent distributor, whereby the agent includes a binding agent to stimulate binding of the powder. The binding agent can include a light absorber. In one example, the binding agent is an ink, for example including an ink-type formulation such as carbon black. The ink may include infra-red or visible light absorber. Further examples of such ink are dye based color ink and pigment based color ink. In another example the agent is an adhesive. In a further example, the at least one agent comprises modifier agents. In one example such modifier agent includes an inhibitor that inhibits binding of the powder. In one example such inhibitor can be distributed next to the agent in order to enhance surface characteristics of the to-be-printed object.

The apparatus 1 includes a powder distributor 3 to distribute powder onto an object support 9 on a layer-by-layer basis. The agent distributor 7 distributes patterns of agent onto each powder layer as derived from data representing slices of at least one 3D object to be generated, wherein each pattern may represent one such slice. In operation the agent penetrates the powder, resulting in respective solidified object slices in each of the layers, and ultimately, in a stack of bound object slices to form at least one unified object in accordance with data representing the object to be generated.

The apparatus 1 includes a controller 11 that is connected to different drive and distribution components of the apparatus 1. The controller 11 may include an ASIC or another type of suitable integrated circuit type controller. For example, the controller 11 includes at least one processor 13 and at least one computer readable medium 15. The computer readable medium 15 includes a non-transitory, non-volatile computer readable memory for at least temporarily storing data representing slices of at least one to-be-generated object. The processor 13 is to instruct the drive and distribution components based on said object data and in accordance with other process specific parameters stored on the computer readable medium 15.

FIG. 1 illustrates an example processed layer 17 in solid lines and a subsequent to-be-build layer 19 in dotted lines. Hereafter, a "processed layer" 17 means a layer 17 in which the pattern of powder has been bound to form the object slice, so that the layer 17 is ready to receive a subsequent layer 19 of powder on top. The processed layer 17 includes at least one bound portion 23 and unbound powder 21 surrounding the bound portion 23. The bound portion 23 represents an object slice of the to-be-generated object. After powder distribution, each layer 17, 19 of powder has a predefined, constant thickness H. However, as discussed below, after processing the bound portions 23 may have a smaller thickness H2 than the unbound portions 21 of the layer 17.

Prior to binding there may be a relatively large amount of gas such as air in the powder. For example on average at least approximately 15 volume percent, at least approximately 25 volume percent, at least approximately 35 volume percent, at least approximately 45 or for example at most approximately 50 volume percent of gas may be present between unbound powder particles. Herein, the volume percent of gas is measured relative to the combined volume of powder particles and gas between these particles. In certain example printing operations, most of the gas is released from the bound portion 23 during the process of melting. Therefore, the combination of powder and agent that forms the bound portion 23 contains less gas than the corresponding powder volume prior to binding, for example less than approximately 10 volume percent, or less than approximately 5 volume percent of gas, and similarly less gas than unbound portions 21 of the same processed layer 17. Therefore, the volume of the bound portion 23 and the total volume of the layer 17 decreases by said binding process.

Upon cooling, a pattern of the powder becomes solid and forms part of the three-dimensional object being generated. During the process of melting, at least part of the gas can be released from the melting powder, which may lead to a lowering of the bound portion thickness H2 with respect to the initial pre-binding thickness and with respect to the thickness H of the unbound remainder 21 of the layer 17. For example, the thickness H2 of the bound portion 23 within the layer 17 is at least approximately 15 percent, at least approximately 25 percent, at least approximately 35 percent, or at least approximately 45 percent and at most approximately 50 percent less than the thickness H of the unbound powder portions 21 of the layer 17. Besides the release of gas, additional variations to the overall printed layer volume may occur due to cooling. However, in one example the shrinking effects of cooling may be as small compared to the shrinking effect of the explained gas release.

The decrease of thickness of the bound portion 23 may leave a lower surface in the processed layer 17 in the form of a pattern, herein defined as a cavity 27. A depth H3 of the cavity 27, as measured with respect to a top surface of unbound portions 21 of the layer 17, may, in one example, be between approximately 15 percent, approximately 25 percent, approximately 35 percent or approximately 45 percent and approximately 50 percent of the thickness H of the initial layer 17. In one example wherein a layer thickness H is approximately 100 microns, the cavity 27 can have a depth H3 of between approximately 15 and 50 microns.

The controller 11 is set to determine a layer volume change of a processed layer 17, with respect to its original unbound powder volume, to be able to compensate by providing more powder in a subsequent layer 19. For example, the controller 11 is set to determine a layer volume change of a processed layer 17 to be between approximately 15 and 50 percent of an initial powder volume of the bound volume 23 prior to binding. For example the layer volume change of a layer 17 is the same as the sum of cavity volumes in that layer 17. In different examples, the controller 11 determines the layer volume change in each processed layer 17 in different ways. For example, the layer volume change can be estimated by one or a combination of (i) sensing a layer top surface profile, (ii) calculating the volume change from the stored data representing slices of at least one 3D object to be generated, and (iii) sensing or measuring agent volumes for each layer 17, 19. For example, for the above items (i) and (ii) the layer volume change can be estimated by multiplying a determined surface area of the cavity 27 with a height H3 of the cavity 27.

To compensate for any cavity 27 formed in a layer of powder, the controller 11 is to instruct the powder distributor 3 to distribute an additional amount of powder in addition to the predefined or "normal" layer amount of powder 29, based on the determined layer volume change in the previous layer 17. The predefined or "normal" layer amount is based on the average x, y and z dimensions of each layer prior to processing and may be constant for each layer within a single print job or a plurality of print jobs. In contrast, the additional powder amount may be variable because it depends each time on any previously bound portion 23 that may vary in size for each layer 17, depending of earlier mentioned object data. Hence, when a subsequent powder layer 19 is distributed on top of the processed layer 17 by the powder distributor 3, the additional powder amount is also distributed in the cavity 27, on top of the bound portion 23, leaving a substantially flat top surface of the subsequent powder layer 19.

In a further example a constant margin of powder is supplied in addition to said predefined layer amount and said additional powder amount. For example, the controller 11 is to instruct the powder distributor 3 to include in each single layer distribution a constant margin independent of, and in addition to, the estimated additional powder amount that is based on the layer volume change. Although in another examples the margin can be set higher when the estimated additional powder amount is higher. The margin can account for potential inaccuracies in calculations or sensor measurements or other difficult-to-predict inaccuracies in the powder distribution. The margin can be approximately 10 volume percent or less, approximately 5 volume percent or less or approximately 3 volume percent or less of a total, predefined layer amount. In another example, the margin may have the same numbers in weight percentages. In one example, this margin may be constant for each layer and/or may depend of certain layer volume settings or other settings of the apparatus 1 that are generally constant over the different layers in a single print job. The difference with the first mentioned additional powder amount is that the first mentioned additional powder amount is dependent of each individual layer volume change, and hence of the object shape that varies over the different layers 17, 19 in a single print job, whereas said margin is constant or dependent of certain apparatus settings or predefined layer volumes in a print job.

For most distributed layers where there are no calculation errors, the margin causes some redundant powder to fall from the object support 9. In one example, by applying the first mentioned additional powder amount based on the layer volume change, said margin can be set relatively low. Hence, an advantage of distributing an additional powder amount based on an estimated layer volume change may be that powder waste per print job can be reduced.

Figure 2:
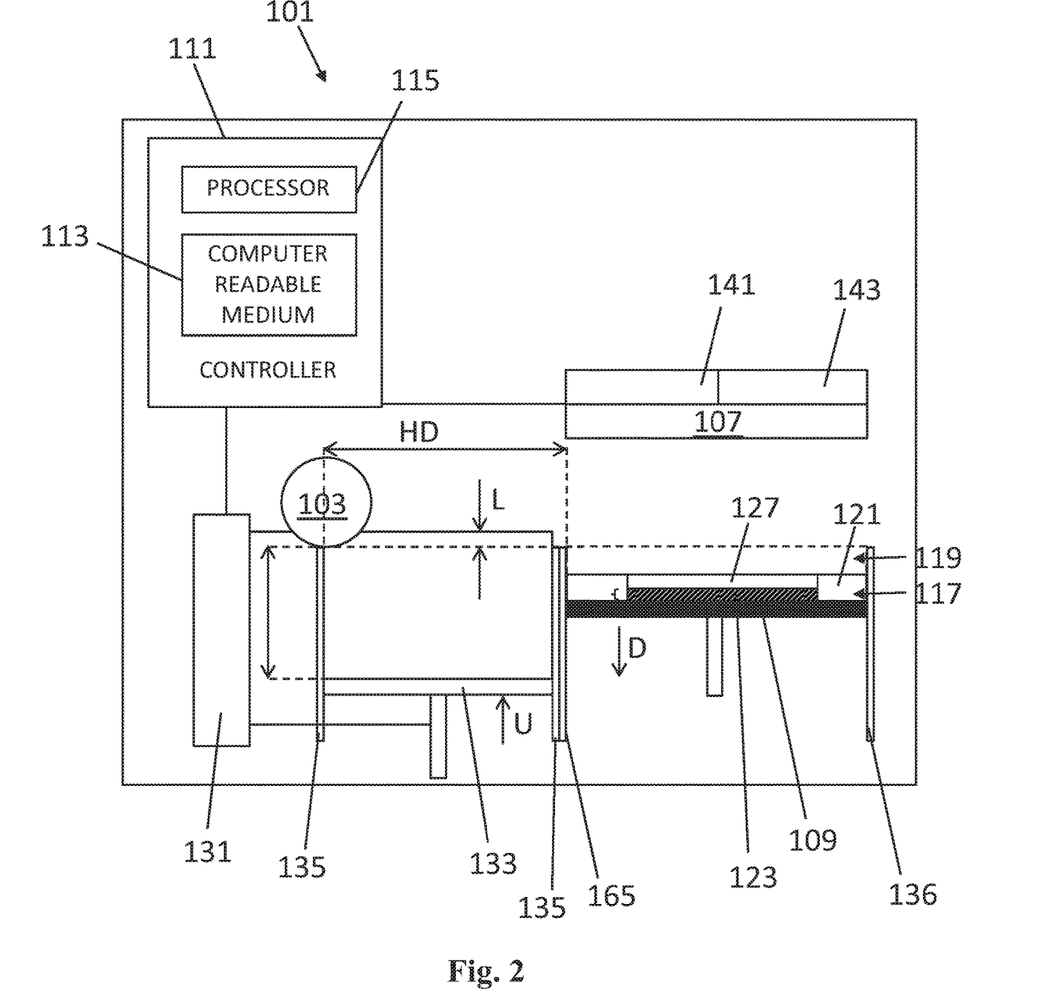
FIG. 2 is a diagram of another example of an apparatus to generate three-dimensional objects.

FIG. 2 illustrates another example diagram of an apparatus 101 to generate three-dimensional objects shown as a cross-section view. The apparatus 101 includes a controller 111 to instruct various drive and distributor components. The apparatus 101 includes a drive system 131. The drive system 131 may include different drive and transmission components. The drive system 131 may include a motor such as an electromotor and certain transmission components such as couplers and gears. In one example the motor includes a DC motor driven by a servo control that in turn is actuated by the controller 111, whereas the transmission system may include at least one linear transmission component such as a worm drive or rack. In other examples, the electromotor can include another suitable type of rotary motor or linear motor or a stepper motor. In other examples the drive system 131 includes small electro-motors or piezo-actuator devices for precise movements of the supports 109, 133.

The apparatus 101 includes a powder distributor 103, a powder support 133, and an object support 109. The powder support 133 supports the powder to be distributed to the object support 109. The powder distributor 103 handles the distribution of a top layer of powder on the powder support 133 to the object support 109.

In one example, the powder distributor 103 sweeps from a start position above the powder support 103, over the powder support 133 and object support 109, to distribute a top layer of powder from the powder support 133 to the object support 109. The powder distributor 103 may include a roller, shovel, wiper or the like to move the powder from the powder support 133 to the object support 109 to form a new layer of powder on the object support 109. The drive system 131 drives the powder distributor 103. The drive system 131 also drives the object support 109 and the powder support 133. In one example the drive system 131 is to move the powder support 133 up (U) and the object support 109 down (D). Side walls 135, 136 may surround each of the supports 133, 109, respectively, to contain the powder. In one example the side walls 135, 136 are static.

The apparatus 101 further includes an agent distributor 107 that is to distribute a binding agent onto a top layer of powder on the object support 109. The agent distributor 107 can be arranged to scan across the object support 109. In another example the agent distributor 107 includes at least one printhead. In one example the printhead may be a scanning printhead that is to scan parallel to the object support 109 along a single axis or in a plane perpendicular to the object support surface. In another example the agent distributor 107 is a static printhead, for example spanning the object support surface. In other examples the object support 109 is moves with respect to the agent distributor 107. The agent distributor 107 may include drop actuators such as thermal resistors or piezo resistors to eject drops.

In further examples, the apparatus 101 includes a sensing unit 141. For example the sensing unit 141 is to read top surfaces of a top layer of powder and output a signal that corresponds to the measured heights of the top layer. The sensing unit 141 is to measure a surface profile of the entire layer at a given sample rate or resolution. For example, the sensing unit 141 may include one of a line-type scanner or a laser array and at least one light detector. In a further example the sensing unit 141 is attached to the agent distributor 107. For example the sensing unit 141 measures top layer heights while the agent distributor 107 scans across the top layer. For example the latter example sensing unit 141 is mounted to scan processed portions of the layer 117. The sensing unit 141 is to send signals corresponding to surface heights to the controller 111 continuously.

The controller 111 calculates a top layer volume change based on the received signals and instructs the powder distributor 103 to add a corresponding additional powder amount in a subsequent layer 119. The signals may correspond to a top surface height profile of the processed layer 117, from which dimensions of the cavity 127 can be derived. In an example, the calculations or estimations of the layer volume changes are to be made between consecutive layer distributions, that is, in real-time without interrupting the printing process.

In further examples, the apparatus 101 includes an exposure unit 143. The exposure unit 143 is to emit energy to the powder and agent to aid in at least one of melting, unifying and solidifying the powder and agent to generate a bound portion 123. The exposure unit 143 may include a light or heat source. For example the exposure unit 143 may be arranged to emit electro-magnetic energy, for example light in a non-visible or visible spectrum, for example ultraviolet or infrared light.

FIG. 2 illustrates an example of a processed layer 117 in solid lines and a subsequent to-be-distributed layer 119 in dotted lines. The processed layer 117 includes a bound portion 123 and unbound powder 121 surrounding the bound portion 123. The processed layer 117 includes a cavity 127 above the bound portion 123. In the illustrated example, one cavity 127 forms the layer volume change.

In another example the controller 111 is to derive the layer volume change from data representing the portions 123 that are to be bound in each layer, which in turn may be derived from original object data. For example the data representing the bound portions 123 may be stored in the form of bitmaps or original vector based data. From the bound portion data, a thickness reduction of each bound portion 123 with respect to the initial thickness of the layer 117 can be estimated in advance. The resulting volume change per layer 117 can be calculated or estimated based on the expected thickness reduction (e.g. 15-50%) multiplied by the summed surface areas of the bound portions 123. Other factors that can be taken into account for the estimation of the volume change per layer may include characteristics of powder particles or the agents used in the process. Layer volume changes may be estimated using a LUT (Look-up Table) stored on the computer readable medium 113.

In one example a thickness reduction of the bound portion 123 is estimated to be between approximately 15 and approximately 50 volume percent of an unbound layer thickness and a resulting estimated layer volume change can be calculated by multiplying the estimated or sensed thickness reduction with the surface area of the bound portion 123. For example, the layer thickness can be derived from the apparatus settings. For example, the surface area of the bound portion 123 can be estimated from the stored data representing the respective object slide.

In another example, the apparatus 101 is to measure distributed agent, for example by detecting agent drops using appropriate detection systems or by deriving it from the object's image data. The controller 111 is to derive the layer volume change based on the detected distributed agent amounts. In a further example, the controller 111 can estimate the layer volume change by using combinations of sensed and estimated data.

In one example, for each distribution, a height of the powder support 133 can be set to sweep a desired amount of powder from the powder support 133 to the object support 109. For example, a step height of the powder support 133 is set in accordance with the estimated total layer amount that includes the additional powder amount. Herein the step height of the powder support 133 is the change in the vertical distance between the powder support 133 and powder distributor 103 at each step. For example a larger step height corresponds to a larger amount of powder that will be supplied to the object support 109. Accordingly, the controller 111 is to instruct the drive system 131 to set a height of the powder support 133 with respect to the powder distributor 103 based on the determined layer volume change, to add powder to fill the cavity 127 in addition to the predefined layer amount.

In one example, the step height of the object support 109 is kept constant for a particular apparatus 1 or print job. Herein the step height of the object support 109 is the change in the vertical distance between the object support 109 and powder distributor 103 in one step. The object support step height can be kept constant within a certain print job or certain print mode but may vary between different print jobs or different print modes. In other examples the object support 109 and/or powder support 133 may move continuously, and the powder distributor 103 can be set to vary the height with respect to the respective supports 109, 133.

In another example the additional powder amount can be varied by adjusting a horizontal distance HD between a starting point of the powder distributor 103 and the object support 109. By varying the starting point of the powder distributor 103 a total amount of powder that can be swept is varied. If the horizontal distance HD from which the powder distributor 103 starts to travel in the direction to the object support 109 is increased, also the total amount of powder distributed over the object support 109 is increased. Hence, in one example the controller 111 is to instruct the powder distributor 103 to adjust a starting distance HD to the object support 109 based on the determined layer volume change of the previous layer 117, to reach a desired total amount of powder.

At each layer distribution action, waste material may be created in the form of redundant powder that passes over one of the walls 136 of the object support 109. In one example, this waste material is collected by a waste material collector (not shown) and routed to the powder support 133, either manually or by the apparatus 1.

Figure 3:
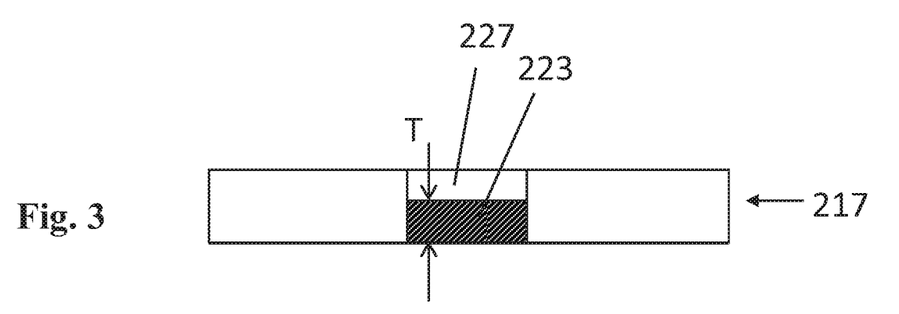
FIG. 3 is a diagram of an example of a layer of powder having a bound portion.
Figure 4:
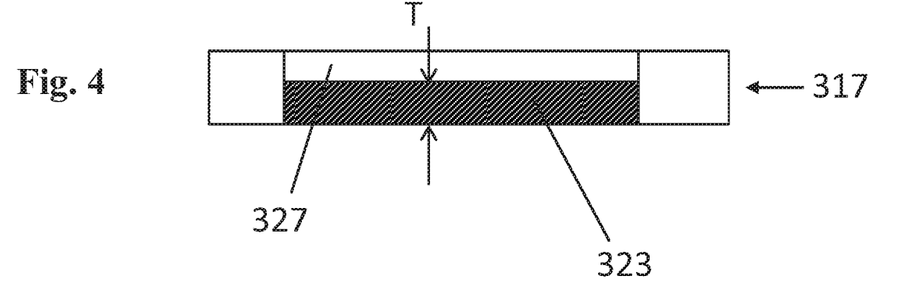
FIG. 4 is a diagram of another example of a layer of powder having a bound portion.

Each of FIGS. 3 and 4 illustrate an example of a single processed layer 217, 317, respectively, generated by a similar type apparatus in a similar type print mode but with different sizes of bound portions 223, 323 that may correspond to different slices of the same object. In FIG. 3 the bound layer 217 includes a relatively small bound portion 223. The relatively small bound portion 223 has a first thickness T between a bottom of the first layer 217 and top surface of the bound portion 223. The relatively small bound portion 223 corresponds to a relatively small cavity 227 and a relatively small layer volume change. In one example the first thickness T is between approximately 15 and 50 percent less than the thickness of the unbound remainder of the same layer 217. In the example of FIG. 3 a small additional amount of powder may be added to the predefined powder amount of the subsequent layer, in order to compensate for the layer volume change. In FIG. 4 the bound layer 317 includes relatively large agent amounts to bind the powder forming a relatively large bound portion 323. The bound portion 323 has a second thickness T that is the same as the first thickness T of the example of FIG. 3. The bound portion 323 of FIG. 4 has a larger surface area than FIG. 3. Hence the bound portion 323 of FIG. 4 is larger than that of FIG. 3. For the example of FIG. 4 a relatively large amount of additional powder is to be added to the predefined powder amount of the subsequent layer to compensate for the larger layer volume change, to fill a larger cavity 327.

Figure 5:
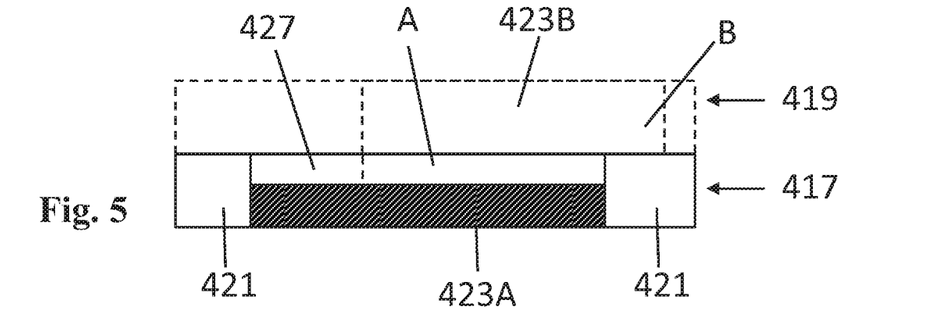
FIG. 5 is a diagram of an example of layers of powder illustrating a new to be supplied layer with partly overlapping bound portions.
Figure 6:
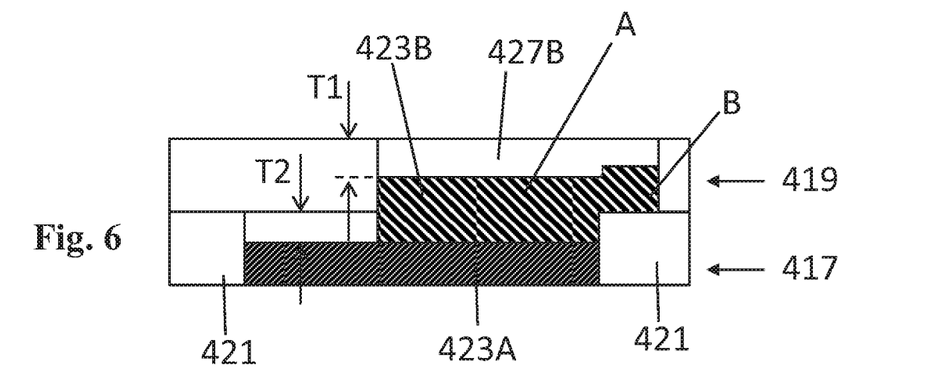
FIG. 6 is a diagram of the example of layers of powder of FIG. 5 wherein said new layer is supplied and bound.

FIG. 5 and FIG. 6 illustrate an example of layers of powder in different subsequent phases. The example of FIG. 5 illustrates a first bound layer 417 having a first bound portion 423A corresponding to a first object slice, unbound powder 421 and a cavity 427. As indicated in dotted lines, a second layer 419 is to be distributed on top of the first layer 417. An additional powder amount is to be included in the second layer 419 to fill the cavity 427.

Hence, the second layer 419 is distributed on top of the first layer 417 that includes the cavity 427 whereby powder fills the cavity 427 above the first bound portion 423A. When distributing the binding agent onto the second layer 419, agent penetrates downwards into the additional amount of powder that fills said cavity 427. Thereby the binding agent in the overlapping region A joins the first bound portion 423A and results in a higher combined bound region 423A, 423B as compared to a neighboring non-overlapping region B in the second bound region 423B. Hence there may be more volume decrease to more gas release in the overlapping regions A of consecutive bound portions 423A, 423B.

FIG. 6 illustrates the second layer 419 after processing. In said overlapping region A, the second bound region 423B of the second layer may have a lower top surface than in the non-overlapping region B. This may be caused by further shrinking in the overlapping region A. Hence, in the second layer 419 a deeper cavity 427B is formed. Correspondingly a depth of the cavity 427B above the overlapping region A may be more then, for example the depth of the cavity 427B above the non-overlapping region B of the second bound portion 423B or the depth of the first cavity 427 of the first bound portion 423A. Hence, in one example the controller is to estimate the layer volume change based on bound portions 423A, 423B of two consecutive layers for adequate compensation. In yet another example the reduced thickness T1 on top of the overlapping bound portions 423A, 423B can be detected in by a sensing unit and the controller bases an estimation on the sensed signals.

Figure 7:
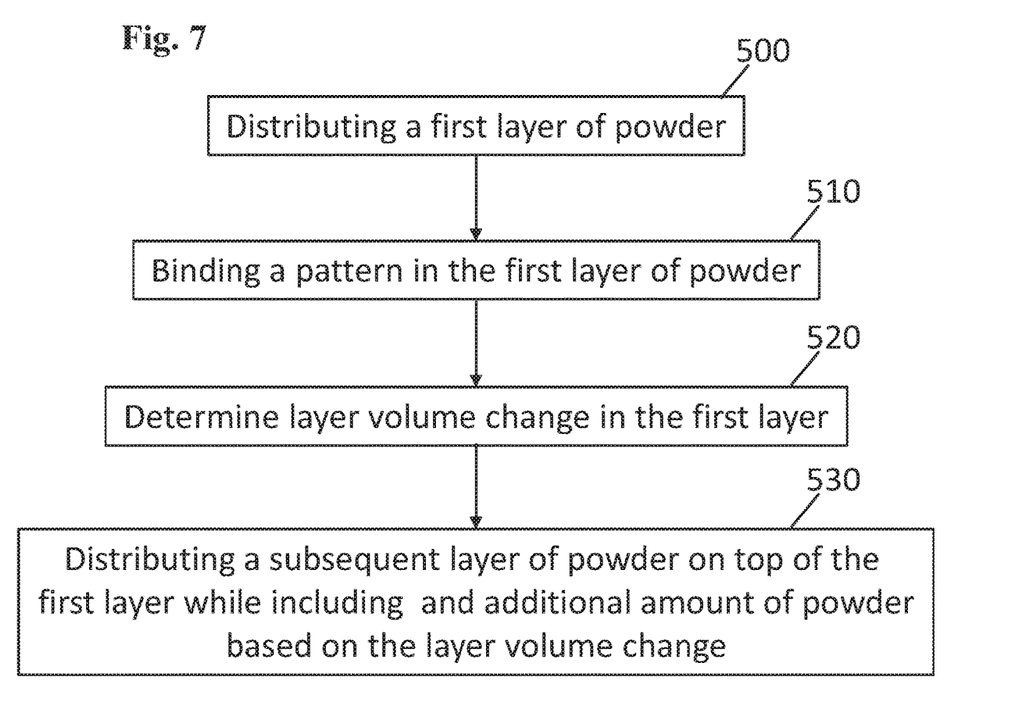
FIG. 7 is a flow chart of an example method of generating a three-dimensional object.

FIG. 7 illustrates an example of a method of controlling a system 1, 101. The method includes distributing a first layer 17, 117, 217, 317, 417 of powder (block 500). The method includes binding a pattern in the first layer 17, 117, 217, 317, 417 of powder (block 510). In one example such binding includes melting the powder with the aid of an agent subsequently solidifying the mix of powder and agent according to said pattern. In another example such binding includes sintering the powder, thereby melting and solidifying the powder according to said pattern. The method includes determining a layer volume change in the first layer 17, 117, 217, 317, 417 of powder (block 520). In one example, the layer volume change is the decrease in volume of the entire first layer 17, 117, 217, 317, 417 as a result of degassing the bound portion 23, 123, 223, 323, 423A. The method further includes distributing a subsequent layer 19, 119, 419 of powder on top of the first layer 17, 117, 217, 317, 417 while including in the subsequent layer 17, 117, 217, 317, 417 and additional amount of powder based on the determined layer volume change (block 530).

Figure 8:
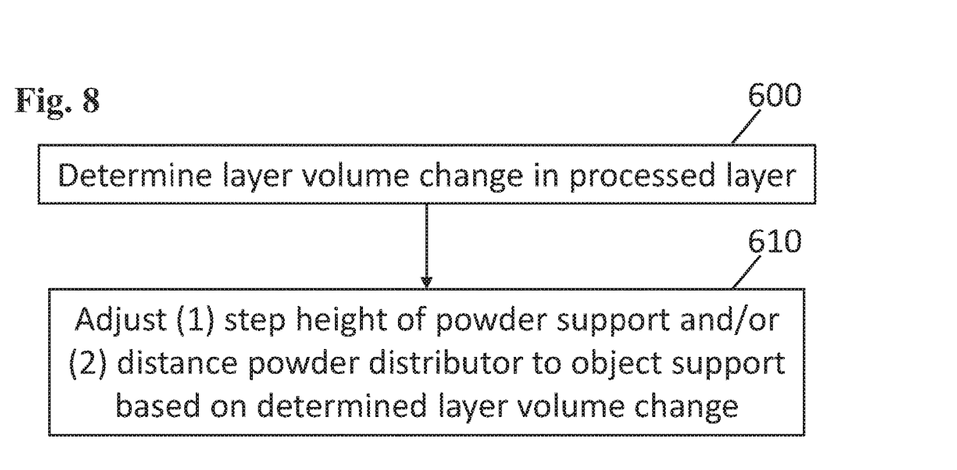
FIG. 8 is a flow chart of another example method of generating a three-dimensional object.

FIG. 8 illustrates another example of a method of three-dimensional printing. The method includes determining a layer volume change within a processed layer 17, 117, 217, 317, 417 of powder (block 600). The method further includes at least one of (i) setting a height of a powder support 133 with respect to a powder distributor 103 based on the determined layer volume change, and (ii) adjusting a starting distance HD of a powder distributor 103 to an object support 109, based on the determined layer volume change (block 610). Block 610 may be executed while maintaining a constant step height of the object support 9, 109.

In this disclosure, the layers that are supplied to an object support 9, 109 may be relatively thin, for example approximately 250 microns or less, approximately 170 microns or less, approximately 120 microns or less, for example approximately 100 microns. For example the layer thickness may be dependent of powder particle size and/or the agent composition. In a further example the drive system is to move the powder support and/or object support correspondingly, over similar step heights. Per this disclosure, depending of the estimated layer volume change the step height can be adjusted over less than a micron, several microns or several tens of microns, for example.

In FIG. 2 only one powder support 133 is illustrated but in other examples multiple powder supports 133 may be used to distribute the powder to a single object support 109. For example at least two powder supports 133 can be used to distribute the powder to one object support 109 from at least two sides, for example from opposite sides. In other examples, multiple bound portions are generated in one layer, and multiple objects can be generated in one print job. Correspondingly, the layer volume change can be sensed or estimated based on multiple separate cavities or bound portions, respectively, in a single layer.

As noted at the beginning of this description, the examples shown in the figures and described above illustrate but do not limit the invention. Other examples are possible. Therefore, the foregoing description should not be construed to limit the scope of the invention, which is defined in the following claims.

What is claimed is:

1. An apparatus to generate a three-dimensional object, comprising
   a powder distributor to distribute layers of powder,
   a binder to bind patterns of powder in a layer of powder, and
   a controller to:
   determine a layer volume change that results from processing of the layer of powder into a processed layer of powder, and
   cause the powder distributor to distribute in a subsequent layer an additional amount of powder based on the determined layer volume change.

2. The apparatus of claim 1 wherein the binder is an agent distributor to distribute a binding agent on the layer of powder.

3. The apparatus of claim 2 wherein the controller is to determine the layer volume change based on a measured previously distributed agent amount.

4. The apparatus of claim 1 comprising
   a powder support,
   an object support, and
   a drive system to move the powder support, wherein the controller is to cause the drive system to set a height of the powder support based on the determined layer volume change.

5. The apparatus of claim 4 wherein the drive system is to move the object support and the controller is to instruct the drive system to maintain a constant step height of the object support.

6. The apparatus of claim 1 comprising an object support, wherein
   the powder distributor is to distribute powder by moving from a starting point in the direction of the object support, and
   the controller is to cause the powder distributor to adjust a horizontal distance between the starting point and the object support based on the determined layer volume change.

7. The apparatus of claim 1 comprising a sensing unit to measure top surface heights of a top layer of powder, the controller to determine the layer volume change based on signals provided by the sensing unit.

8. The apparatus of claim 1 wherein the controller is to estimate the layer volume change based on data defining the pattern that is to be bound within the layer of powder.

9. The apparatus of claim 8 wherein the controller is to determine the layer volume change based on two consecutive layer patterns.

10. The apparatus of claim 1 wherein the controller is set to determine the layer volume change of the processed layer to be between approximately 15 and 50 percent of an initial powder volume of a bound volume prior to binding.

11. Non-transitory non-volatile computer readable medium comprising machine readable instructions that cause a processor to
    determine a layer volume change that results from processing of a layer of powder into a processed layer of powder, and
    instruct a powder distributor to distribute an additional amount of powder in a subsequent layer based on the determined layer volume change.

12. The computer readable medium of claim 11 comprising further machine readable instructions to cause a processor to instruct a drive system to set a height of a powder support based on the determined layer volume change.

13. The computer readable medium of claim 12 comprising further machine readable instructions to cause a processor to instruct a drive system to maintain a constant step height of an object support.

14. The computer readable medium of claim 11 comprising further machine readable instructions to cause a processor to instruct a drive system to set a horizontal distance between a starting point of a powder distributor and an object support based on the determined layer volume change.

15. A method of controlling a system to distribute powder, comprising:
    distributing a first layer of powder,
    binding a pattern in the first layer of powder,
    determining a layer volume change that results from processing of the first layer of powder, and
    distributing a subsequent layer of powder on top of the first layer, while including in the subsequent layer an additional amount of powder based on the determined layer volume change.

16. The method of claim 15, comprising setting a height of a powder support based on the determined layer volume change.

17. The method of claim 15, comprising maintaining a constant step height of an object support.

18. The method of claim 15, setting a horizontal distance between a starting point of a powder distributor and an object support based on the determined layer volume change.

19. The method of claim 15, wherein determining the layer volume change in the first layer of powder is based on data defining the pattern that is bound within the first layer of powder.

20. The method of claim 15, wherein determining the layer volume change comprises sensing a top surface height of the first layer of powder.

* * * * *